Sept. 12, 1939.         H. V. HOLMAN         2,173,057
SAFETY LATHE DOG
Filed Jan. 29, 1937

INVENTOR.
Harry V. Holman
BY Alfred N. Petchaft
ATTORNEY.

Patented Sept. 12, 1939

2,173,057

UNITED STATES PATENT OFFICE 2,173,057

SAFETY LATHE DOG

Harry V. Holman, Chicago, Ill.

Application January 29, 1937, Serial No. 122,911

3 Claims. (Cl. 82—41)

This invention relates generally to safety appliances for lathes and, more particularly, to a novel and improved form of safety lathe dog.

Very frequently in the performance of various operations upon a lathe, it is necessary to mount the work between opposed spindles or cones and then effect driving connection between the work and the lathe-head by means of a device commonly known in the art as a dog. The dog customarily comprises an annular ring of metal having a radially outwardly extending L-shaped arm, which extends backwardly and engages in a suitable aperture in the lathe-head. The ring is further provided with a radially extending internally threaded aperture in which is ordinarily mounted a square-headed set screw. It will be readily understood that, as this mechanism revolves with the lathe-head, the outwardly extended or projecting portion of the set screw is exceptionally dangerous. Frequently this revolving member catches on the fabric of the machinist's sleeve or clothing and pulls the entire arm and hand down into the moving machinery, with the result that the machinist may be more or less seriously injured. It is not an infrequent occurrence that the machinist, in leaning over the work to make a measurement or to inspect a particular portion of the machinery will accidentally come too close to the lathe-head, so that the projecting end of the dog set screw will catch his necktie or a loose flapping portion of his collar or shoulder and draw the man's head and shoulders down against the revolving machinery and cause serious injuries to the head and shoulders, which may even result in death. Safety engineers have long since condemned the use of lathe dogs of the conventional character. Prior to the present invention, however, so far as I am aware, no one has been able to find a truly satisfactory type of safety lathe dog.

My present invention, therefore, has for its primary object the provision of a novel and improved type of lathe dog, which is safe and will not subject users thereof to the hazard of accident and injury, which is simple and economical in construction, and which is otherwise entirely efficient in the performance of its intended functions.

And with the above and other objects in view, my invention resides in the novel features of form, construction, arrangement, and combination of the several parts presently described and pointed out in the claims.

In the accompanying drawing.

Figure 1:
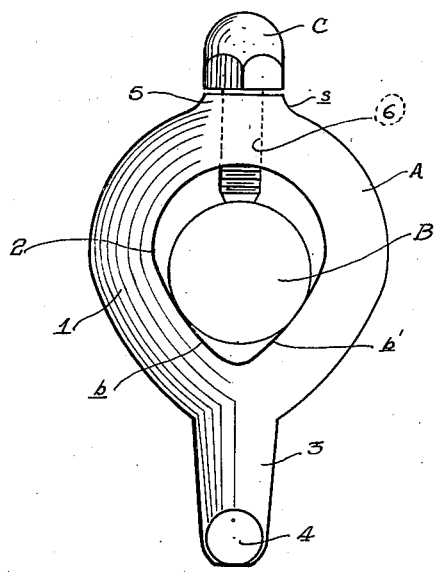
Figure 1 is a vertical elevational view of a lathe dog constructed in accordance with and embodying my present invention.

Referring now more in detail and by reference character to the drawing, which illustrates a preferred form of my invention, A designates the body portion of a lathe-dog, which, for purposes of illustration, is shown in embracing engagement around a work-piece B, which is clampingly held within the lathe-dog by means of the set-screw C.

The lathe-dog A may be either cast or forged as particular requirements for strength and quality may indicate and comprises an annular ring-shaped member 1 having an inner surface 2 of general arcuate contour increasing in radius toward one end, as shown at $b$, $b'$, to provide a somewhat V-shaped jaw portion for engagement with the work piece B. Formed integrally with the ring or body portion 1 and extending radially outwardly therefrom, is a tail-piece 3 provided at its lower extremity with an engagement arm or so-called "tail" 4, which is preferably integrally formed with the tail-piece 3 and extends perpendicularly outwardly therefrom in a line substantially parallel to the longitudinal axis of the work-piece B. It may be noted in this connection that, for certain purposes, it is desirable to provide a tail-piece 3 without the outwardly extending engagement arm or tail, commonly referred to as a "straight-tail" lathe-dog, and it will be understood, therefore, that the present invention is equally applicable to either type.

The ring portion 1 is furthermore provided with an integrally formed upstanding shoulder or hub 5, the outer surface of which is smoothly curved to join with the outer surface of the ring portion 1 in a smooth and uninterrupted manner, as best seen at $s$ in Figure 1. Disposed centrally of the shoulder or hub 5 and extending radially through the ring portion 1 of the dog A, is an internally threaded aperture 6.

Threadedly mounted in the aperture 6 for clamp-wise engagement with the selected work-piece B, is the lathe dog screw C comprising a conventionally threaded shank 7 provided at its one extremity with a hardened contact point 8 and at its other extremity with a substantially hemispherical head-member 9. The head-member 9 is particularly ground or turned to provide a substantially smooth, hemispherical, head-surface presenting no edges or corners which will catch either the clothing or flesh of the machinist who may accidentally come into unsafe proximity with the moving head of the lathe.

Figure 2:
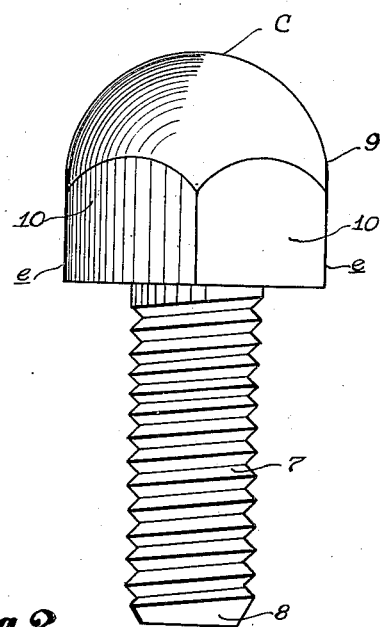
Figure 2 is an enlarged elevational view of the lathe dog set screw of my present invention.
Figure 3:
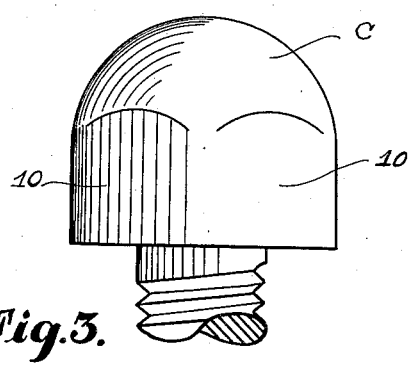

It is, of course, necessary to provide the head 9 with flat surface portions 10, against which the jaws of a wrench or other tightening tool may impinge. These surfaces 10 are disposed at 90° to each other and may intersect to form the corners or edges e, to provide an axially extending skirt of substantially square cross-section, as best seen in Figure 2. It will be apparent that these corners or edges e extend substantially in a radial direction when the lathe-dog is in actual use, and thus do not contribute in any substantial manner to the hazard or danger normally inherent in the conventional type of lathe dog now in use. If desired, however, the edges e may be arcuately rounded off, as shown in Figure 3, thus eliminating any danger from such edges.

Figure 4:
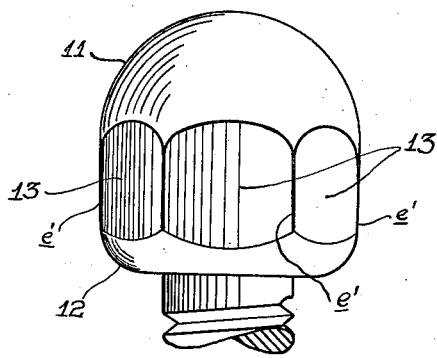
Figures 3 and 4 are fragmentary elevational views of modified forms of lathe-dog set-screws of my present invention.

In the event that the lathe dog is intended for use with a wide range of differently sized workpieces, so that the under surface of the head of the lathe dog screw may at times be positioned at a substantial distance from the upstanding shoulder or hub 5, I have found that it is possible to further insure against injury and other hazards by utilizing a lathe dog screw having a head-member C', as shown in Figure 4, comprising an upper spherical surface 11, a lower arcuate surface 12, and an intermediate series of flat wrench-receiving surfaces 13, which intersect to form the edges e'. As has been pointed out above, these edges do not in any substantial manner constitute a hazard nor do they materially reduce the safety characteristics of the device. If, however, it is desired, these edges may be arcuately rounded off in a manner previously described and shown in Figure 3.

It will be evident that the present invention thus provides a simple, efficient, and economical type of lathe dog, which in actual use and practice presents no sharp corners which may accidentally catch upon the flesh or clothing of the user. In addition to this, lathe dogs constructed in accordance with the present invention are simple and easily used and do not require any change in the technique of lathe operation. This latter factor is, among other things, particularly important, since safety engineers have found that machinists of long experience tend to take safety measures rather lightly and particularly dislike using redesigned safety tools, particularly when such tools require a substantially different technique or mode of use. Lathe dogs constructed in accordance with the present invention not only entirely eliminate the hazards and dangers formerly inherent in this type of device but, in addition, require no new technique of mechanical operation or use and are, therefore, readily acceptable to the machinists.

It should be understood that changes and modifications in the form, construction, arrangement and combination of the several parts of the lathe dog may be made and substituted for those herein shown and described without departing from the nature and principle of my invention.

Having thus described my invention, what I claim and desire to secure by Letters Patent is,

1. A lathe-dog comprising a ring shaped body portion for embracingly engaging a selected work-piece, a tail formed integrally with and extending radially outwardly from the body portion, and a set-screw threadedly mounted in and extending radially through the body portion for clampingly engaging the work-piece, said screw being provided with a substantially hemi-spherical head having an axially extending skirt of substantially polygonal cross-section, the bottom edge of said skirt being rounded off to form an arcuate surface.

2. A lathe-dog comprising a ring shaped body portion for embracingly engaging a selected work-piece, a tail formed integrally with and extending radially outwardly from the body portion, and a set-screw threadedly mounted in and extending radially through the body portion for clampingly engaging the work-piece, said screw being provided with a substantially hemi-spherical head having an axially extending skirt of substantially polygonal cross-section and having a diagonal dimension substantially equivalent in length to the diameter of the hemi-spherical head.

3. A lathe dog comprising, a ring-like body portion for embracingly engaging a selected work piece; said body portion having a tail extending substantially radially outwardly at one side and being provided with a threaded opening spaced from the tail and a set-screw turned into said opening and provided at its outer end with a head of polygonal form said head having the outer end surface thereof rounded over to be of substantially hemispherical form with the adjacent angles of the polygonal form rounded for a substantial distance to eliminate sharp corners.

HARRY V. HOLMAN.